United States Patent Office 3,382,213
Patented May 7, 1968

3,382,213
ONE-STAGE RESIN AND PROCESS FOR PREPARING SAME COMPRISING REACTING A SPACED POLYPHENOL AND AN ALDEHYDE
John D. Nelson, Pittsfield, and William F. Mufatti, Longmeadow, Mass., assignors to General Electric Company, a corporation of New York
No Drawing. Filed May 12, 1966, Ser. No. 549,437
6 Claims. (Cl. 260—57)

This invention is directed to a thermosetting resinous condensation product which can be advanced to an infusible state upon exposure to elevated temperatures, and which is the reaction product of more than one mole of aldehyde per mole of spaced polyphenol and phenol combined. In addition, this invention is also directed to a one-step process for preparing the thermosetting resinous condensation reaction product herein.

Generally, it has been known to react and prepare condensation reaction products of methylolated spaced polyphenols, phenol and an aldehyde. This is fully disclosed in U.S. Patent 2,859,204. As set forth therein, the patent is generally directed to a two-stage condensation reaction product. By this it is meant that a two-stage condensation reaction product further needs an external cross-linking agent in order to be set up or advance to an infusible state. In addition, the U.S. Patent describes a process for preparing these two-stage resins which involves many different steps. The steps include first preparing a methylolated spaced polyphenol and then reacting the methylolated spaced polyphenol with a phenol to prepare what is termed as a cross-condensate. This is generally carried out in the presence of a strong acid catalyst such as sulfuric acid. The resulting cross-condensate or cross-condensation reaction product is then reacted with an aldehyde to prepare a resinous condensation product which in the presence of a cross-linking agent can be advanced to an infusible state. The resin so prepared in accordance with the teaching of U.S. Patent 2,859,204 is one wherein less than one mole of total aldehyde is reacted per mole of the spaced polyphenol and phenol combined. In the true sense, such a material without the cross-linking agent is a thermoplastic material which can be heated and cooled many times without changing or advancing the resin to an infusible state.

Therefore, it is an object of this invention to provide a one-stage thermosetting resinous condensation product of a spaced polyphenol, a phenol and an aldehyde.

Another object of this invention is to provide a one-step process for preparing the one-stage thermosetting resinous condensation product.

Other objects and advantages of this invention will become apparent from the following detailed description thereof.

Briefly, in accordance with the practice of this invention, these and other objects are obtained by reacting a spaced polyphenol, a phenol and an aldehyde in the presence of a particular alkyline catalyst wherein the amount of aldehyde reacted is more than one mole thereof per mole of spaced polyphenol and phenol combined. In addition, the process further requires carrying out the reaction initially at a temperature of at least 130° C. and wherein less than one mole of an aldehyde is reacted per mole of spaced polyphenol and phenol combined. The reaction is then cooled to a temperature of about 80–115° C. and additional aldehyde is added in order to react more than one mole of total aldehyde per mole of spaced polyphenol and phenol combined. The resulting product is a one-stage thermosetting resinous condensation reaction product which can be advanced to an infusible state upon exposure to elevated temperatures.

The following examples are set forth to illustrate more clearly the principle and practice of this invention to those skilled in the art and are not meant to be limiting in the practice thereof, and unless otherwise specified, where parts or percentages are mentioned, they are parts or percentages by weight.

Example I

To a reaction kettle fitted with a reflux condenser, 330 parts of a spaced polyphenol, 508 parts of phenol, and 16.7 parts of magnesium hydroxide are added. The spaced polyphenol is that which is prepared by the alkylation of a phenol with a chlorinated hydrocarbon. The mixture is heated to a temperature of about 140° C. To this is then added incrementally 134 parts of paraformaldehyde over a period of about 45 minutes while maintaining at temperature of about 140° C. The reaction is then cooled to a temperature of about 100° C. To the reaction vessel is then added incrementally 75 parts of paraformaldehyde over a period of about 25 minutes. Excess phenol is then removed under vacuum distillation. Upon cooling the resin solidifies to a clear single-phase homogeneous resin. The resin sets up to an infusible state upon exposure to 150° C. It has a stroke cure of about 95 seconds at a temperature of 150° C.

Example II

Example I is repereated except that sodium hydroxide is employed herein in place of the magnesium hydroxide employed in Example I. The resin solidifies during the initial addition of paraformaldehyde.

Example III

Example I is repeated except that during the second addition of paraformaldehyde, a temperature of 140° C. is employed in place of the 100° C. employed in Example I. The resulting resin cannot be controlled and solidifies before complete addition of the paraformaldehyde.

The instant invention is directed to a one-step process for preparing a one-stage heat curable thermosetting resinous condensation reaction product. The one-step process of this invention comprises reacting a spaced polyphenol, a phenol and an aldehyde in the presence of a particular catalyst. More specifically, the process requires (1) heating a spaced polyphenol and a phenol in the presence of the particular catalyst to a temperature of at least 130° C., (2) reacting less than one mole of an aldehyde per mole of spaced polyphenol and phenol combined, (3) cooling the reaction to a temperature of 80–115° C., and (4) then reacting additional aldehyde such that the total aldehyde reacted is more than one mole of aldehyde per mole of spaced polyphenol and phenol combined. The particular catalyst employed herein is one selected from the group consisting of earth alkali metal, earth metal and heavy metal hydroxides and oxides. Preferably the amount of aldehyde reacted is 1.0–3.0 moles of an aldehyde per mole of spaced polyphenol and phenol combined and is reacted, preferably, incrementally with the spaced polyphenol and phenol.

The surprising and critical feature of the instant invention is that the reaction must be carried out at a temperature initially of at least 130° C. and that only a partial amount of the aldehyde is reacted with the spaced polyphenol and phenol. It is necessary that the amount of aldehyde reacted in this first initial part of the reaction be less than one mole thereof per mole of the spaced polyphenol and phenol combined. The second critical feature of the instant invention is that the reactants are cooled to a temperature of about 80–115° C. and the additional aldehyde is reacted to react more than one mole of total aldehyde per mole of the spaced polyphenol and phenol combined. The resulting product so prepared is what is known as a one-stage thermosetting resin, which resin can be advanced to an infusible state by exposure to elevated temperatures.

The thermosetting condensation reaction product prepared by the process of this invention can exist either as a solid, a liquid resin or a resin in an organic solvent. To prepare the solid resin herein, it is necessary to remove excess phenol at the end of the reaction. The solid resin so produced may be classified as a one-stage lump resin which may be ground to a finely divided particle size. To prepare the resin in an organic solvent which may be commonly called a varnish, this merely requires the addition of a solvent at the end of the reaction.

As stated previously, the reaction of the instant invention is a one-step process for preparing the thermosetting resinous condensation reaction product. It is necessary in the one-step process to carry out the reaction in the presence of a particular catalyst. As stated, the particular catalyst employed herein can be either an earth alkali metal, earth metal or heavy hydroxide or oxide. Some of the catalysts that may be employed in this invention are barium hydroxide, magnesium hydroxide, calcium hydroxide, aluminum oxide, aluminum hydroxide, zinc oxide, calcium hydroxide, zinc hydroxide, iron oxide, manganese oxide, etc. In the practice of the one-step process of this invention, magnesium hydroxide is the preferred alkaline catalyst.

As used herein an aldehyde shall mean any aldehyde which will react with the phenol and spaced polyphenol. These include such aldehydes as paraformaldehyde, formaldehyde, acidaldehyde, butylaldehyde, furfuraldehyde, etc. Preferably the aldehyde employed in the practice of this invention is paraformaldehyde.

In addition, as also employed herein, a phenol shall mean a monohydroxybenzene (phenol) and substituted phenols containing alkyl groups, alkoxy groups and halogen radicals. Again the preferred material to be employed in the practice of this invention is phenol, the monohydroxybenzene.

The spaced polyphenols employed herein are those as fully described in U.S. Patents 2,859,204 and 2,800,512. These are generally prepared by reacting a phenol with a chlorinated hydrocarbon. This may be better termed as alkylation of a phenol with a chlorinated hydrocarbon. Spaced polyphenols are considered the broader term as described in U.S. Patent 2,859,204. They are also known in the art as "wax phenols." Generally, in the preparation of these spaced polyphenols, the reaction of the chlorinated hydrocarbon and the phenol are carried out in the presence of a Friedel-Crafts catalyst at elevated temperatures. In addition, the phenol employed in the preparation of these spaced polyphenols may be either phenol, resorcinol, hydroquinone, catechol, xylenol, hydroxydiphenyl, benzolphenol, phenolethylphenyl, methylhydroxydiphenyl, ethylhydroxydiphenyl, alpha and beta naphthols, alkyl naphthols, phenol naphthol, toluol naphthol, xylol naphthol, benzyl naphthol, etc. as well as halogenated and etherified derivatives thereof.

The thermosetting resinous condensation reaction product of this invention can be advanced to the thermoset state by merely exposing the resin to elevated temperatures. Temperatures that may be suitable for advancing the resin are generally in the range of 85° C. to 200° C. Of course, the higher the temperature, the shorter the time required to advance the resin to the infusible state.

The products produced by the process of this invention and the compositions claimed and disclosed herein find wide applications in such areas as moldings, preparation of laminates, foundry sands, core binders, adhesives, and bonding of abrasives, etc. In addition, other material may be employed in admixture with the resinous compositions of this invention and such materials that may be included are dyes, fillers, such as wood flour, asbestos, etc. and any other materials that can be incorporated with the resin but which do not have a detrimental effect on the properties or use of the resin. In addition, the liquid resin and resins in organic solvents of this invention can be used for treating paper for use in preparing battery separators or as core stock resins for treating paper employed in preparing decorative laminates. In general, these resins are suitable wherever a bonding application is needed.

It will thus be seen that the objects set forth above among those made apparent from the preceding description are efficiently attained and since certain changes may be made in carrying out the above process and in the composition set forth without departing from the scope of this invention, it is intended that all matters contained in the above description shall be interpreted as illustrative and not in a limiting sense.

What is claimed is:

1. A one-step process for preparing a one-stage thermosetting resinous condensation product which process comprises (1) heating a monohydric spaced polyphenol and a phenol in the presence of a particular catalyst to a temperature of at least 130° C., said spaced polyphenol consisting of a polyarylolated hydrocarbon having phenolic nuclei separated from each other by polymethylene claims, (2) reacting less than one mole of an aldehyde per mole of spaced polyphenol and phenol combined, (3) cooling the reaction to a temperature of about 80–115° C. and (4) reacting additional aldehyde such that the total aldehyde reacted is more than one mole thereof per mole of spaced polyphenol and phenol combined; said particular catalyst being selected from the group consisting of earth alkali metal, earth metal and heavy metal hydroxides and oxides.

2. The process of claim 1 wherein the aldehyde is paraformaldehyde.

3. The process of claim 1 wherein excess phenol is removed from the final reaction product.

4. The process of claim 1 wherein 1.0–3.0 moles of total aldehyde are reacted per mole of spaced polyphenol and phenol combined.

5. The process of claim 1 wherein the adhehyde is reacted incrementally.

6. A thermosetting resinous condensation product prepared by the process of claim 1.

References Cited

UNITED STATES PATENTS 2,859,204  11/1958  Florentine et al. _____ 260—51

WILLIAM H. SHORT, *Primary Examiner.*

H. SCHAIN, *Assistant Examiner.*

UNITED STATES PATENT OFFICE

CERTIFICATE OF CORRECTION

Patent No. 3,382,213                          May 7, 1968

John D. Nelson et al.

It is certified that error appears in the above identified patent and that said Letters Patent are hereby corrected as shown below:

Column 4, line 32, after "(1) heating a" cancel "monohydric"; line 33, after "and a" insert -- monohydric --.

Signed and sealed this 16th day of September 1969.

(SEAL)
Attest:

Edward M. Fletcher, Jr.                     WILLIAM E. SCHUYLER, JR.

Attesting Officer                              Commissioner of Patents